United States Patent
Cox et al.

[11] Patent Number: 6,079,926
[45] Date of Patent: Jun. 27, 2000

[54] SELF-PROPELLED HAY BALE RETRIEVER AND STACKER

[76] Inventors: James Y. Cox, 23333 Rd. 7 SE.; Ole Andersen, P.O. Box 1027, both of Warden, Wash. 98857

[21] Appl. No.: 09/123,934

[22] Filed: Jul. 27, 1998

[51] Int. Cl.[7] .................................................. B60P 1/50
[52] U.S. Cl. .................................... 414/111; 414/492
[58] Field of Search ........................ 296/183; 414/111, 414/471, 480, 486, 492, 501, 555, 679

[56] References Cited

U.S. PATENT DOCUMENTS

| | | | |
|---|---|---|---|
| 2,745,562 | 4/1956 | Vandemark et al. | 414/555 |
| 2,848,127 | 8/1958 | Grey . | |
| 3,515,291 | 6/1970 | Grey et al. . | |
| 3,622,024 | 11/1971 | Grey et al. . | |
| 4,088,272 | 5/1978 | Grillot | 414/111 |
| 4,426,183 | 1/1984 | Butler | 414/111 |
| 4,459,075 | 7/1984 | Eichenberger | 414/555 |
| 4,498,829 | 2/1985 | Spikes | 414/24.5 |
| 4,619,570 | 10/1986 | Siebenga . | |
| 4,630,986 | 12/1986 | Taylor | 414/24.6 |
| 4,634,336 | 1/1987 | Pearce | 414/546 |
| 4,789,289 | 12/1988 | Wilson | 414/24.6 |
| 4,952,111 | 8/1990 | Callahan | 414/111 |
| 4,971,504 | 11/1990 | Klompien | 414/111 |
| 5,150,999 | 9/1992 | Dugan | 414/24.5 |
| 5,320,472 | 6/1994 | Matlack | 414/111 |
| 5,333,981 | 8/1994 | Pronovost et al. | 414/24.5 |
| 5,397,208 | 3/1995 | Siebenga | 414/111 |
| 5,507,612 | 4/1996 | Siebenga | 414/111 |
| 5,639,198 | 6/1997 | Pearce | 414/24.5 |
| 5,647,716 | 7/1997 | Tilley | 414/111 |
| 5,695,311 | 12/1997 | Miguel et al. | 414/111 |
| 5,758,481 | 6/1998 | Fry | 414/111 |
| 5,813,814 | 9/1998 | Smart | 414/789.7 |

*Primary Examiner*—Dean Kramer
*Assistant Examiner*—Gregory A Morse
*Attorney, Agent, or Firm*—Miller Nash LLP; Bruce A. Kaser

[57] ABSTRACT

The invention is a self-propelled hay bale retriever and stacker ("retriever/stacker") for loading, transporting, and unloading bales of hay. The retriever/stacker has a tiltable bed for receiving the bales, and has movable side railings mounted to the bed, with each side railing carrying pivotal upper racks. The retriever/stacker also has a pair of spreadable forks mounted to the aft end of the bed. Attached to the front end of the retriever/stacker is a loader for lifting bales off the ground and moving them onto the bed.

8 Claims, 14 Drawing Sheets

SELF-PROPELLED HAY BALE RETRIEVER AND STACKER

TECHNICAL FIELD

This invention relates to agricultural vehicles. More particularly, the invention relates to a self-propelled vehicle for loading, transporting, and unloading large bales of hay.

BACKGROUND INFORMATION

Hay crops are harvested using machines that collect and create bales that are dropped on the field. The bales are then loaded on hay wagons or flat bed trucks and taken to another location for storage.

While some hay bales are small and weigh only 60–80 pounds, efficiency and economics require the production of significantly larger bales that weigh up to one ton. The standard "large" bales are rectangular in shape and have dimensions of 4×4×8 feet.

Because of the size and weight of these large bales, there is a need for a vehicle that can load, transport, and unload the bales in an efficient manner. In particular, the number of bales loaded and transported needs to be maximized, while concurrently minimizing the loading and unloading times. To maximize the load, insure even weight distribution, and make unloading easier, the bales must be compactly stacked/arranged in multiple layers on the vehicle, with the sides of the bales substantially flush with one another. Some operations simply use forklifts to load the bales. However, this method is cumbersome and time-consuming because a forklift can pick up, load, and position only one bale at a time. Further, when attempting to arrange the bales into a large stack, forklifts have difficulty stacking large bales on top of or next to each other, such that the bales are aligned properly. Proper alignment is important so that stacked bales do not tip over in time.

The present invention is a self-propelled hay bale retriever and stacker ("retriever/stacker") that solves the above problems by providing a mechanism for loading and aligning the bales on a bed of the retriever/stacker. Among other things, the invention has a set of railings and racks that align the bales as they are loaded. The invention also has a loader that can easily and quickly deposit the bales on to the bed of the retriever/stacker. With these features, the invention dramatically improves the loading and unloading time. Further, because of the improved design, the retriever/stacker can maximize the load of bales: two layers of large bales, with each layer having five bales. To the inventors' knowledge, there is no existing apparatus or vehicle that can accomplish this.

SUMMARY OF THE INVENTION

The invention is a self-propelled hay bale retriever and stacker ("retriever/stacker") for loading, transporting, and unloading bales of hay. The retriever/stacker has a tiltable bed. A pair of spaced-apart side railings are mounted to the bed, with the side railings being movable inwardly and outwardly relative to the bed. Each side railing carries an upper rack that is pivotable for swinging movement along a lengthwise axis relative to the side railing.

The invention further includes a pair of spreadable forks mounted at the aft end of the bed. Like the side railings, the rear brackets are movable inwardly and outwardly relative to the sides of the bed. A pusher driven by a hydraulic cylinder is mounted to the retriever/stacker and is used for pushing bales onto the bed.

Another aspect of the invention includes a loader mounted to the front end of the retriever/stacker. The loader comprises a vertical support arm mounted to the front end of the retriever/stacker, and a first and second link, each pivotally connected to the support arm. A first hydraulic cylinder is pivotally connected to the first link and to the front end of the retriever/stacker. A second hydraulic cylinder is pivotally connected to the first and second links. In operation, these cylinders cooperate to pivot the links about the support arm for lifting a bale off the ground and onto the bed.

The various parts of the invention and how they work, as summarized above, will become better understood after reviewing the following detailed description which is to be read in conjunction with the drawings.

BRIEF DESCRIPTION OF THE DRAWINGS

In the drawings, like reference numerals refer to like parts throughout the various views, unless indicated otherwise, and wherein.

BEST MODE FOR CARRYING OUT THE INVENTION

Figure 1:
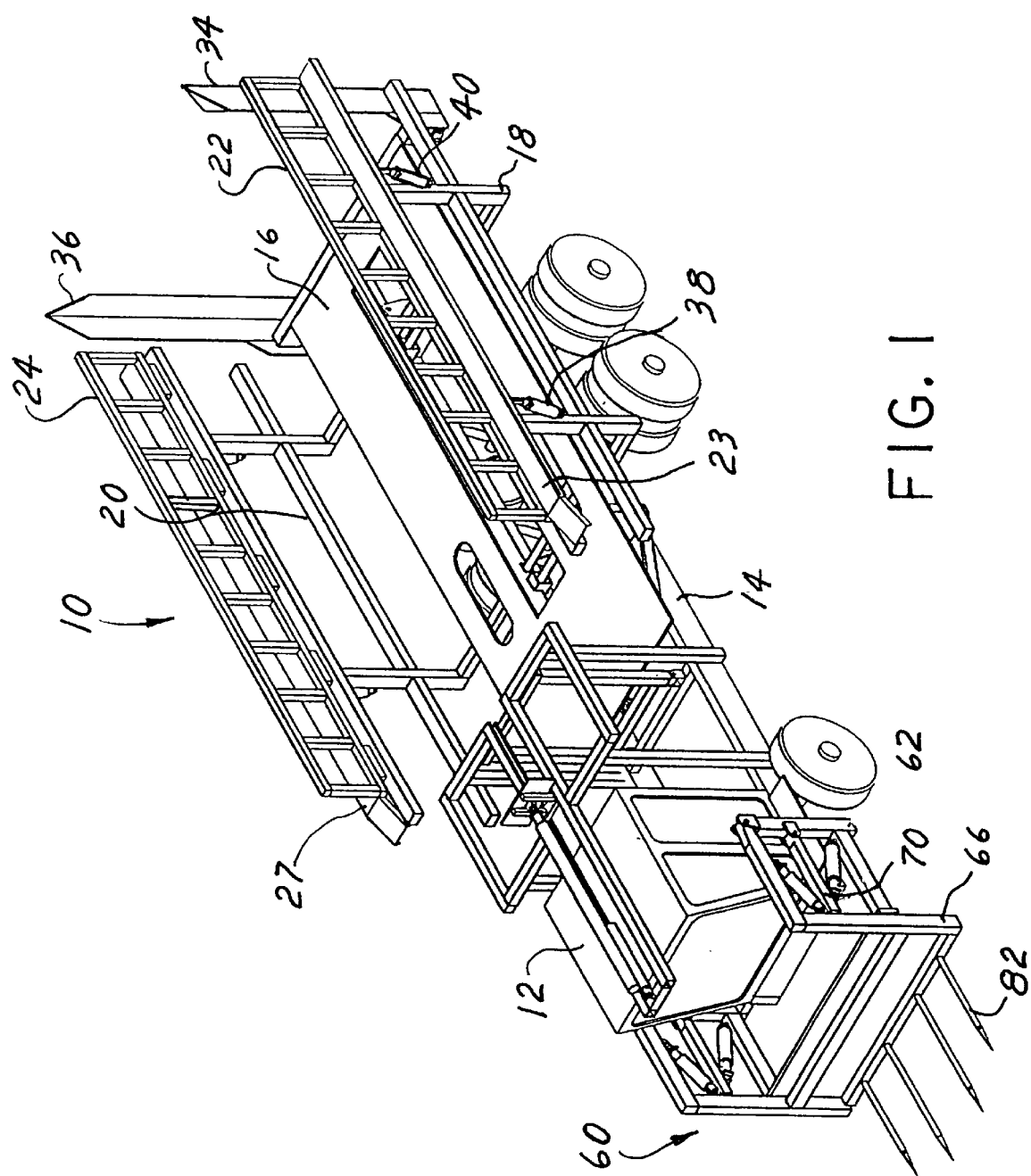
FIG. 1 is a perspective view of the self-propelled hay bale retriever/stacker constructed in accordance with the invention.
Figure 2:
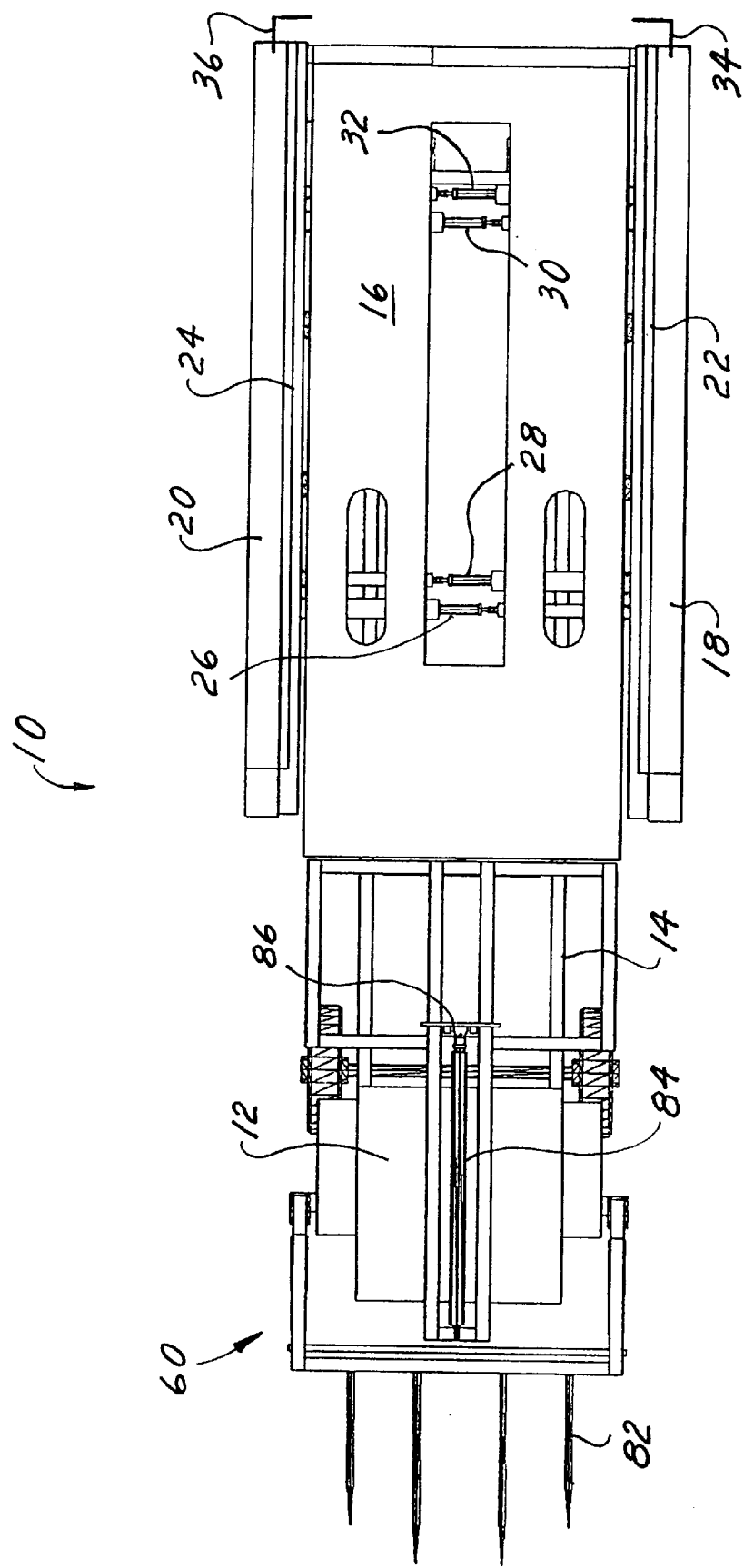
FIG. 2 is a top view of the retriever/stacker shown in FIG. 1.

Referring first to FIG. 1, shown generally at 10 is the self-propelled hay bale retriever/stacker. The retriever/stacker 10 is similar in appearance to a conventional flat bed truck and includes an operator cab 12 and rear chassis 14. The retriever/stacker 10 has a flat bed 16 mounted to the rear chassis 14, the bed 16 being operable to tilt from a horizontal position to a vertical position. The retriever/stacker 10 also has a hay loader 60 mounted on its front end for lifting bales off the ground and positioning each bale for loading on the bed 16. The operation of the loader 60 will be described in detail later.

Figure 10:
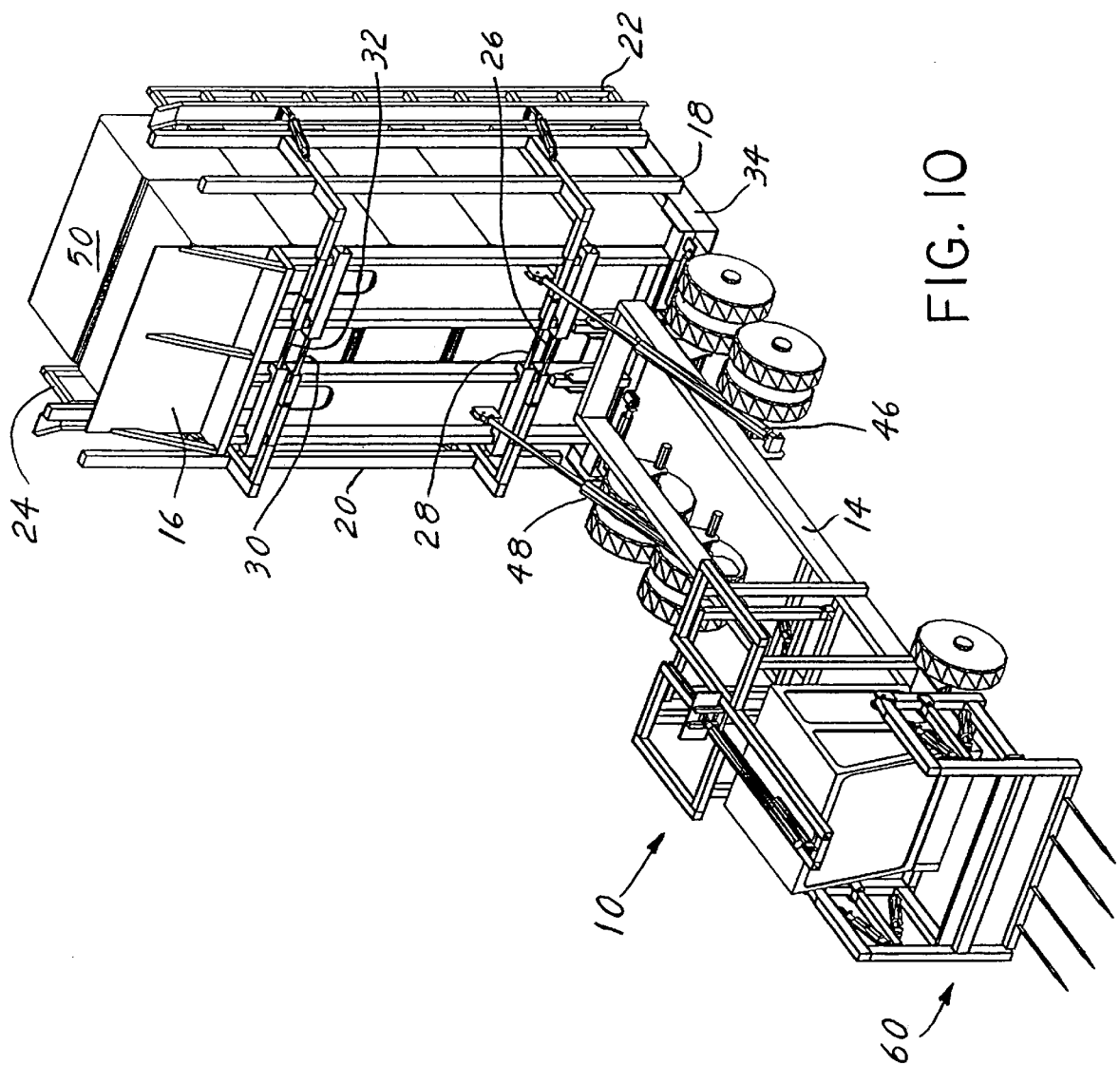
Figure 11:
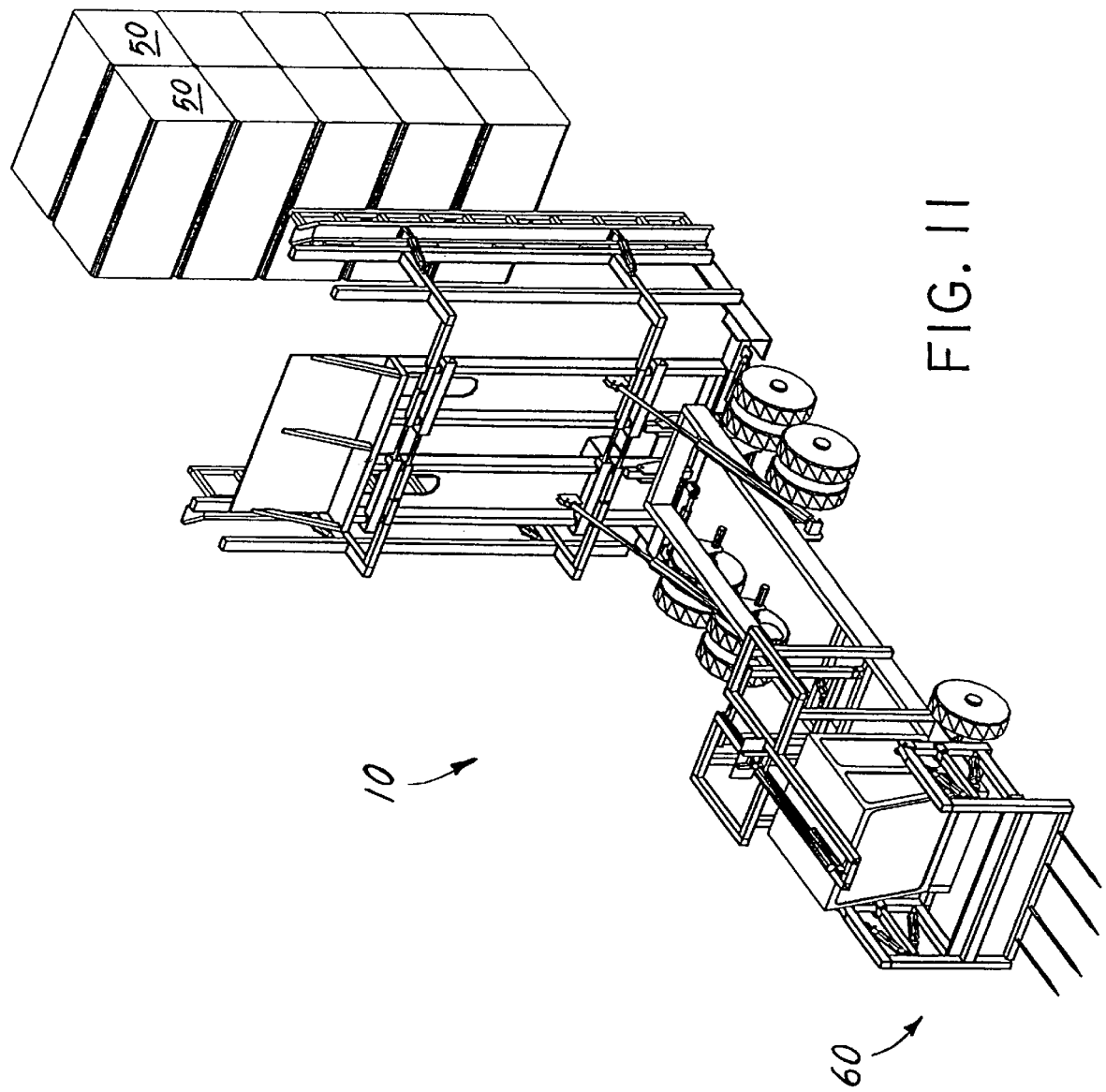
Figure 12:
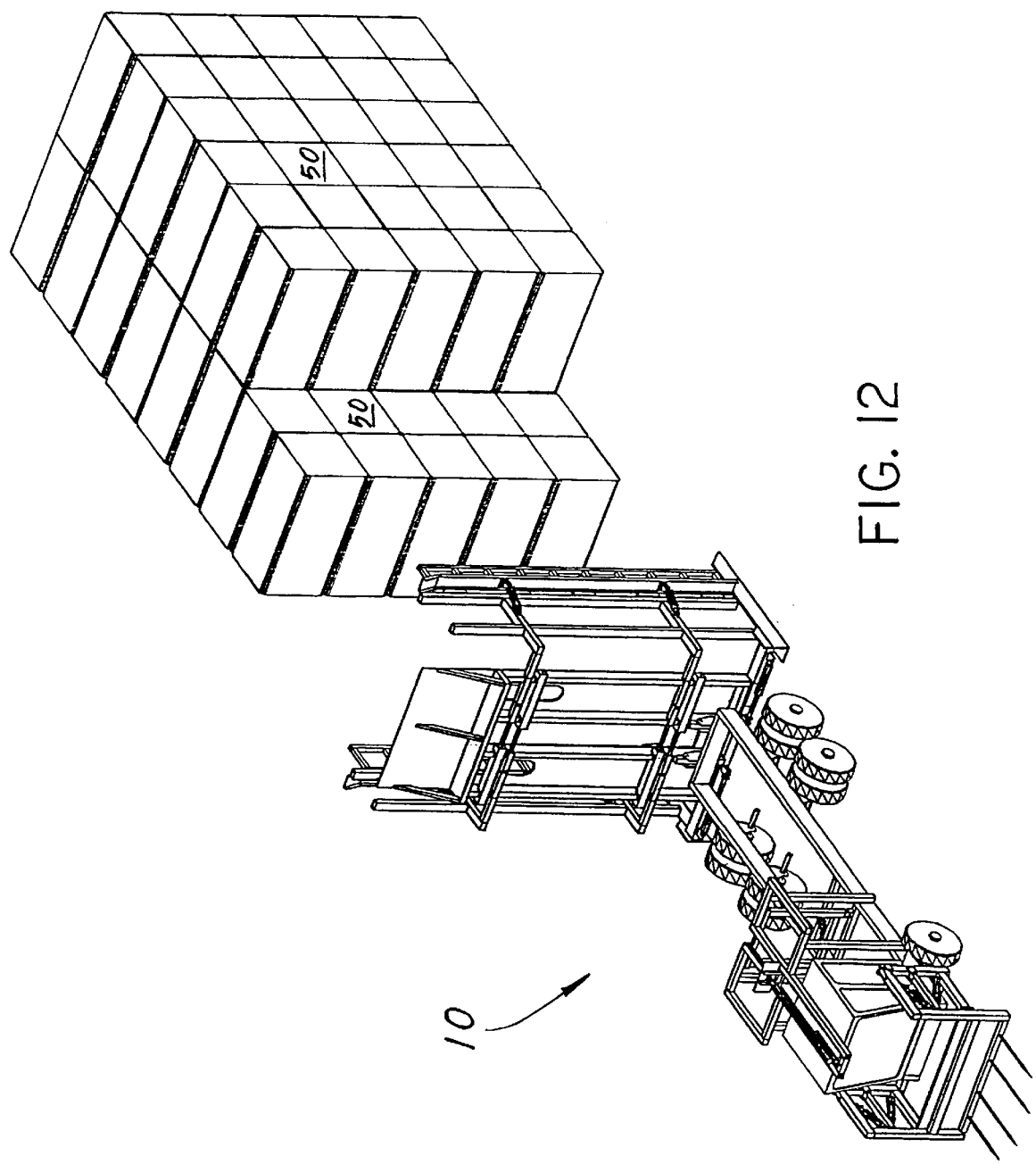

Mounted along the lateral sides of the bed 16 are rails 18 and 20. As can be seen best in FIGS. 10–12, the rails 18 and 20 are preferably mounted from the underside of bed 16, in a manner such that the each rail 18 and 20 can move laterally outward from the sides of the bed 16. The manner in which the rails move is generally by sliding via mating channels, moving along rollers and tracks, or via some other conventional means located on the underside of the bed 16.

Hydraulic cylinders 26, 28, 30, and 32 (shown in FIGS. 2, 10–12) extend and contract to move the rails outwardly or inwardly, respectively. These cylinders are conventional, having piston rods that extend from the cylinders when high pressure hydraulic fluid is pumped into them.

Figure 3:
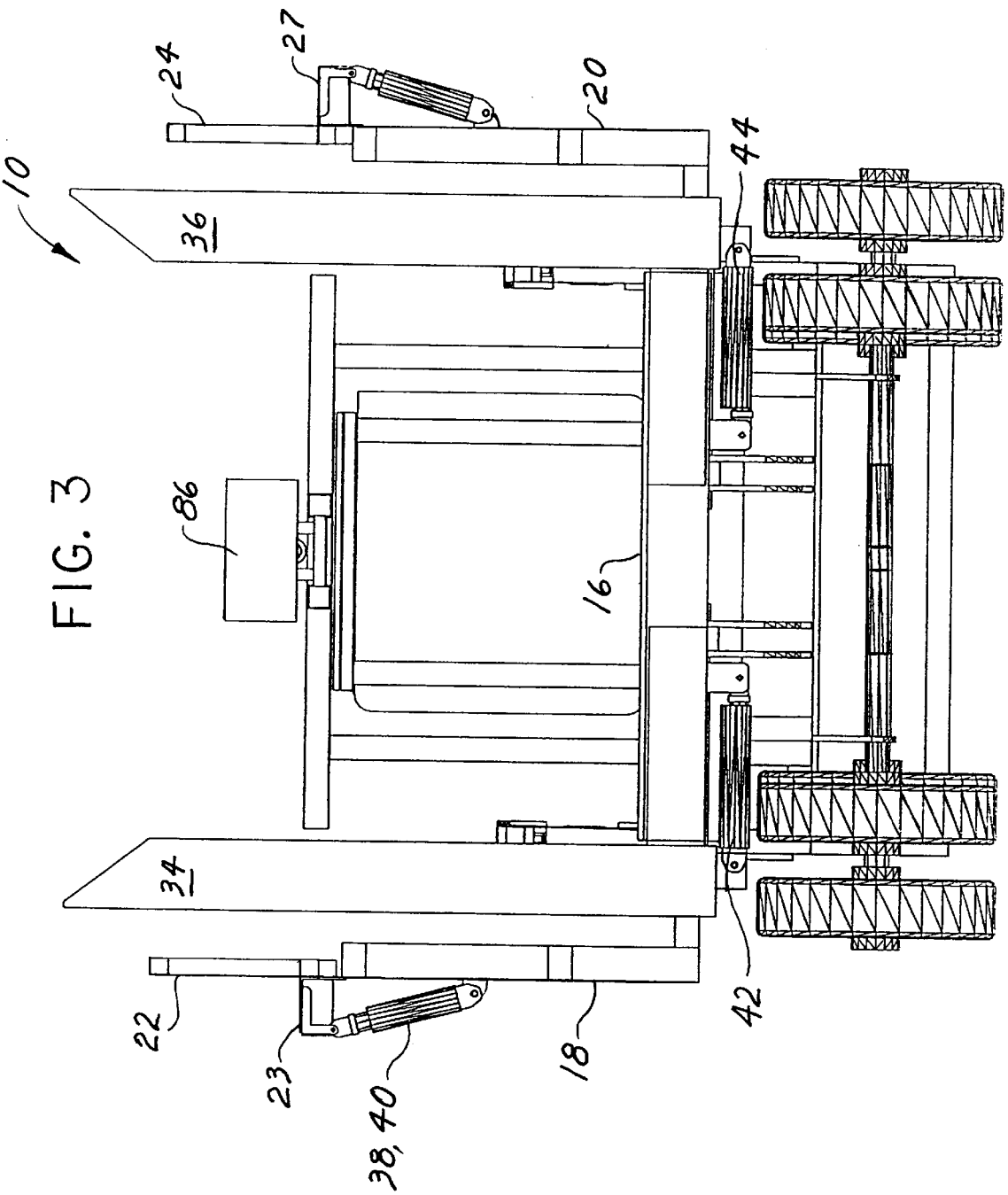
FIG. 3 is a rear view of the retriever/stacker shown in FIG. 1.

Pivotally mounted to the upper portions of rails 18 and 20 are racks 22 and 24, respectively. As shown in FIGS. 1 and 3, hydraulic cylinders 38 and 40 are pivotally connected to rail 18 and rack 22 (with a similar arrangement for the other rail 20 and rack 24), such that each rack can swing along a lengthwise axis relative to the side railing. When the hydraulic cylinders 38 and 40 extend, rack 22 pivots inwardly to a substantially horizontal position (see FIG. 8). Likewise, when the hydraulic cylinders 38 and 40 contract, the rack 22 pivots back to a vertical position. The racks 22 and 24 each have flanges 23 and 27, which orient vertically when the racks 22 and 24 pivot to their horizontal position, serving as additional abutments to guide and hold the hay bales in place.

As mentioned, the bed 16 can tilt from a horizontal position to a vertical position. The mechanism for allowing the bed 16 to tilt is conventional in nature, and generally involve the use of larger hydraulic cylinders 46 and 48, shown in FIGS. 10 and 11. For additional support, when the bed 16 is not in the fully upright position, a movable brace 54, shown in FIGS. 4 and 5, is positionable below the front portion of the bed 16 by the contracting action of hydraulic cylinder 52.

Other features of the retriever/stacker 10 include a pair of forks 34 and 36, located on the aft end of bed 16. The forks are preferably L-shaped and have a vertical orientation. Like the rails 18 and 20, the forks 34 and 36 can spread laterally outward and inward, through the extension and contraction, respectively, of hydraulic cylinders 42 and 44 (see FIG. 3). The retriever/stacker also has a pusher 84 driven by a hydraulic cylinder, with one end connected to the cab 12, and the other end connected to a plate 86 (see FIG. 5).

Figure 4:
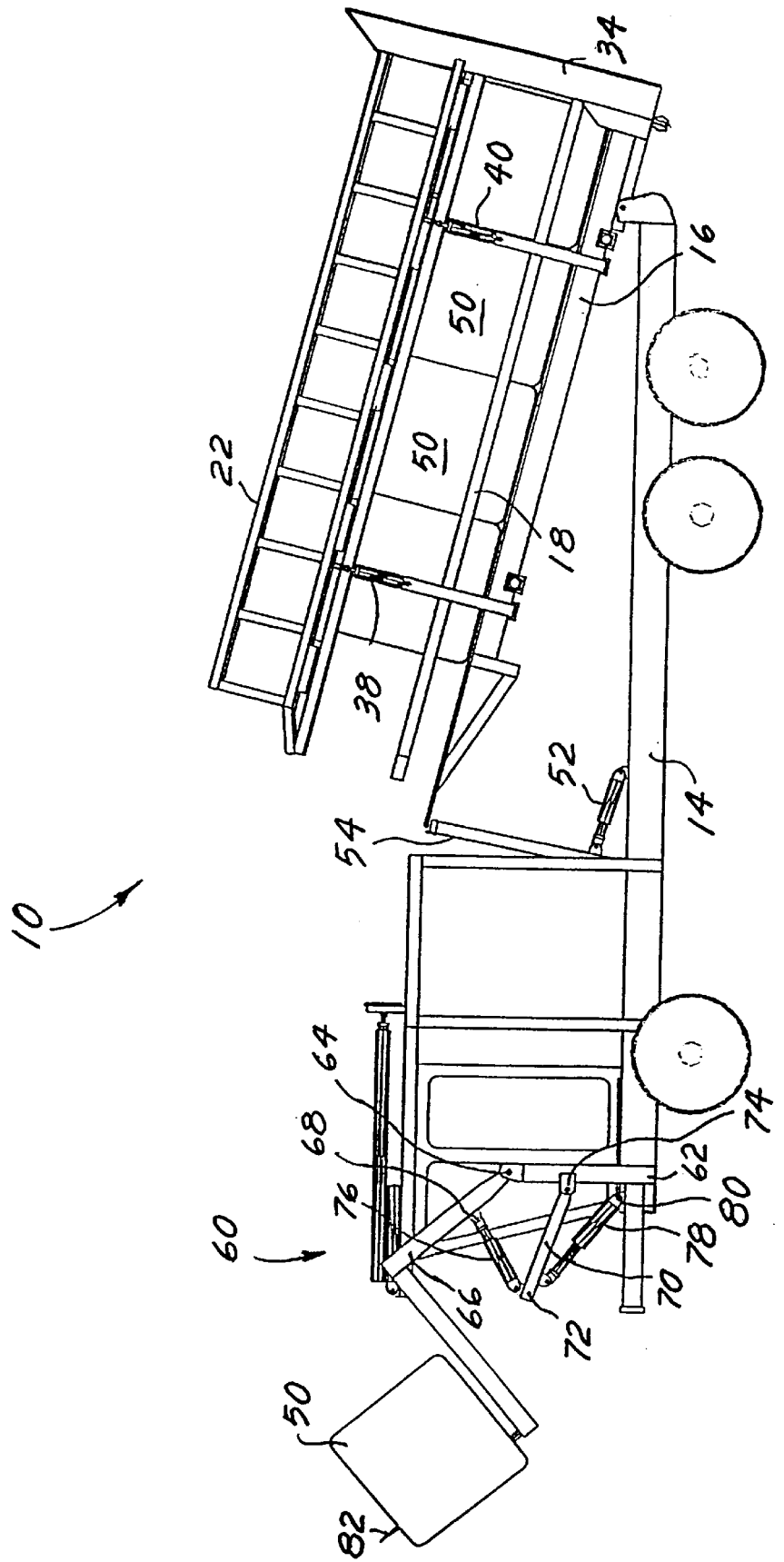
FIG. 4 is a side view of the retriever/stacker, showing how a bale of hay is lifted at the front of the retriever/stacker and how a first layer of hay bales is positioned on the retriever/stacker's tilted flat bed.
Figure 5:
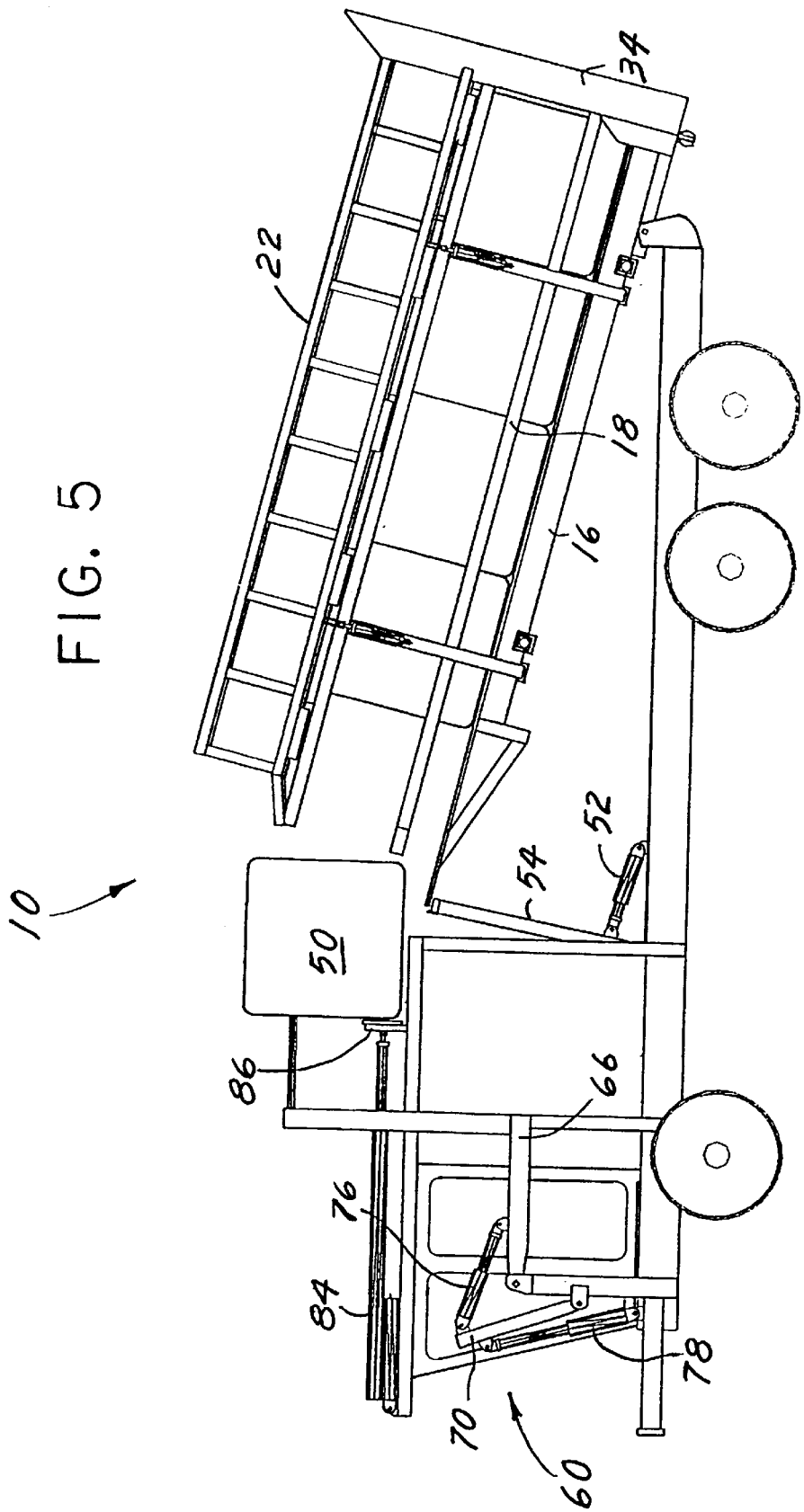
FIG. 5 is a view like FIG. 4, but shows how a bale is pushed onto the flat bed.
Figure 6:
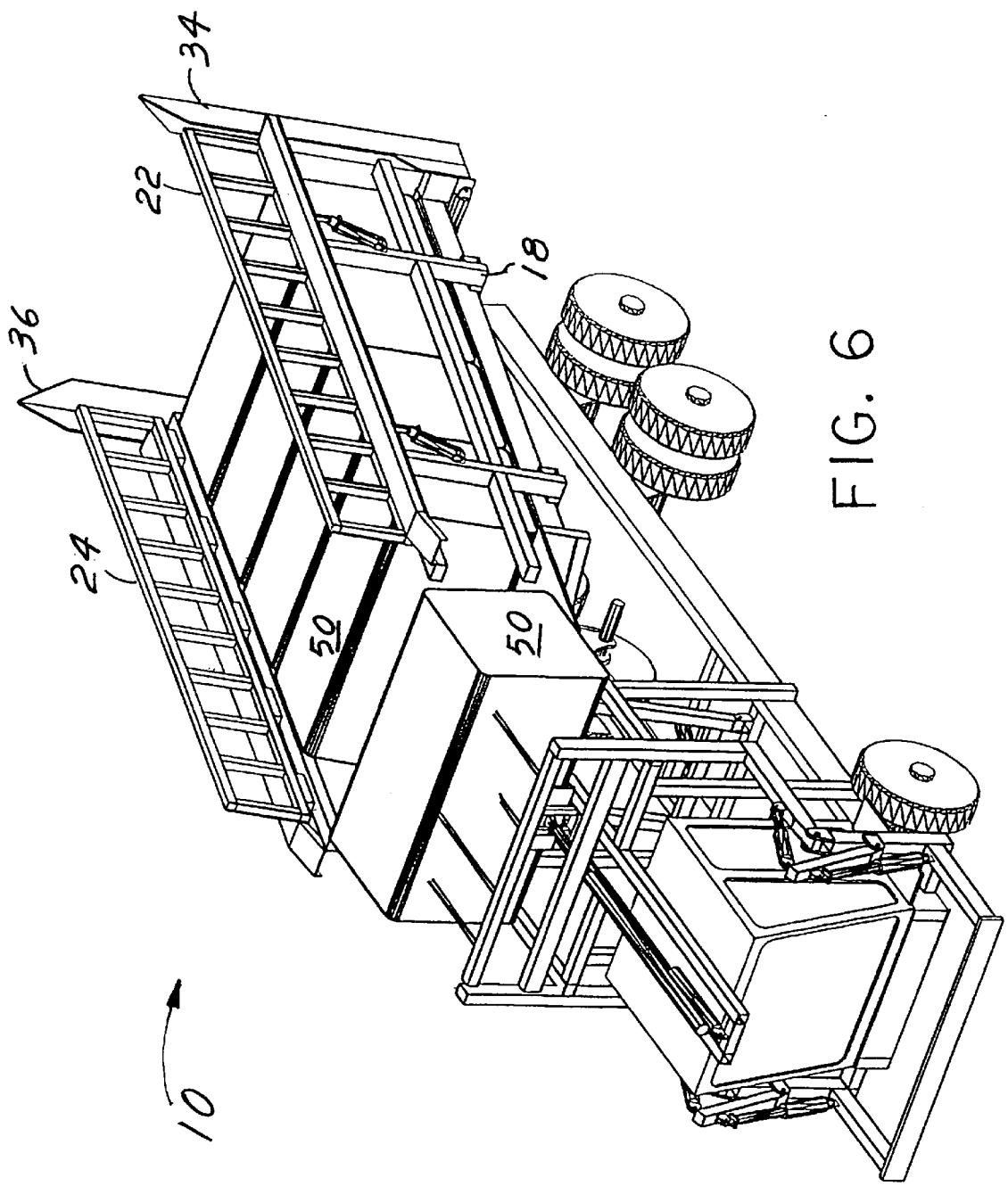
FIG. 6 is a perspective view of the retriever/stacker shown in FIG. 5.

In operation, the bed 16 is first partially tilted to the position shown in FIG. 4. In this initial position, the rail 18 and rack 22 are also vertical, and preferably, are extended away from the lateral sides of the bed 16 in an "outward" position. The retriever/stacker 10 is then driven towards a bale of hay 50 lying on the ground, so that loader 60 can impale the bale with tines 82. As shown in the sequence of FIGS. 4–6, the loader 60 lifts a bale 50 off the ground and then rotates the bale 50 over the cab 12, towards the tilted bed 16. When the bale 50 is positioned at the edge of the bed 16, as indicated in FIG. 5, the pusher 84 extends to push the plate 86 against the bale 50, so that the bale 50 can drop onto the tilted bed 16.

The bale 50 then slides down towards the rear of the bed 16 until it rests against the interior surfaces of the forks 34 and 36. The railings 18 and 20 also serve as abutments to keep the bale 50 positioned properly as it slides downward on the bed 16. Preferably, railings 18 and 20 are flared at their front ends, towards the cab 12, so as to act as a funnel to facilitate the positioning and sliding of the bale 50 when the bale is first placed at the front end of bed 16. This feature is not shown in the drawings. The process is repeated for four more bales 50, with each successive bale 50 sliding down the bed 16 and positioning itself next to and against the prior-loaded bale, until five bales are loaded (the "bottom layer").

Figure 7:
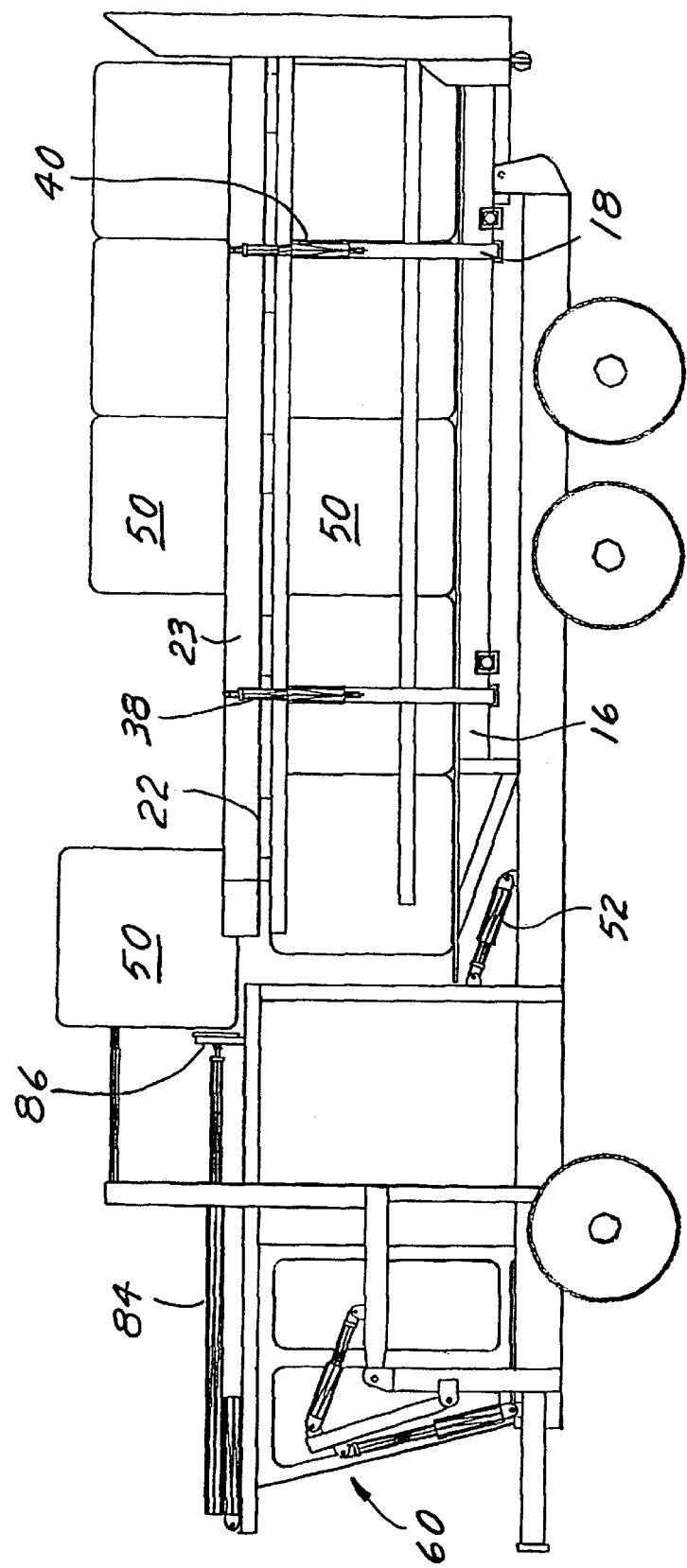
FIG. 7 shows how a second layer of hay bales is positioned on the tilted flat bed.
Figure 8:
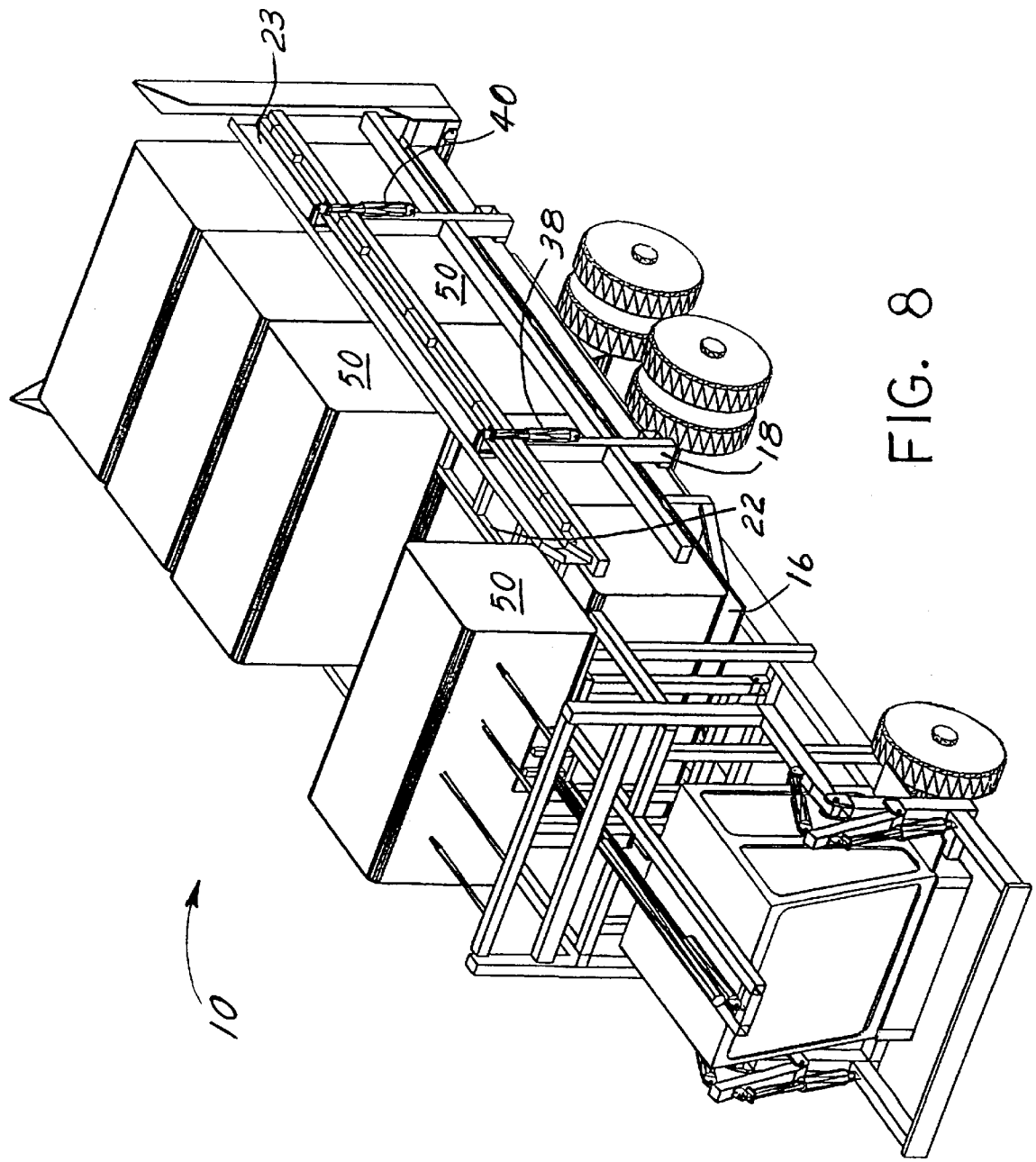
FIG. 8 is a perspective view of the retriever/stacker shown in FIG. 7.
Figure 9:
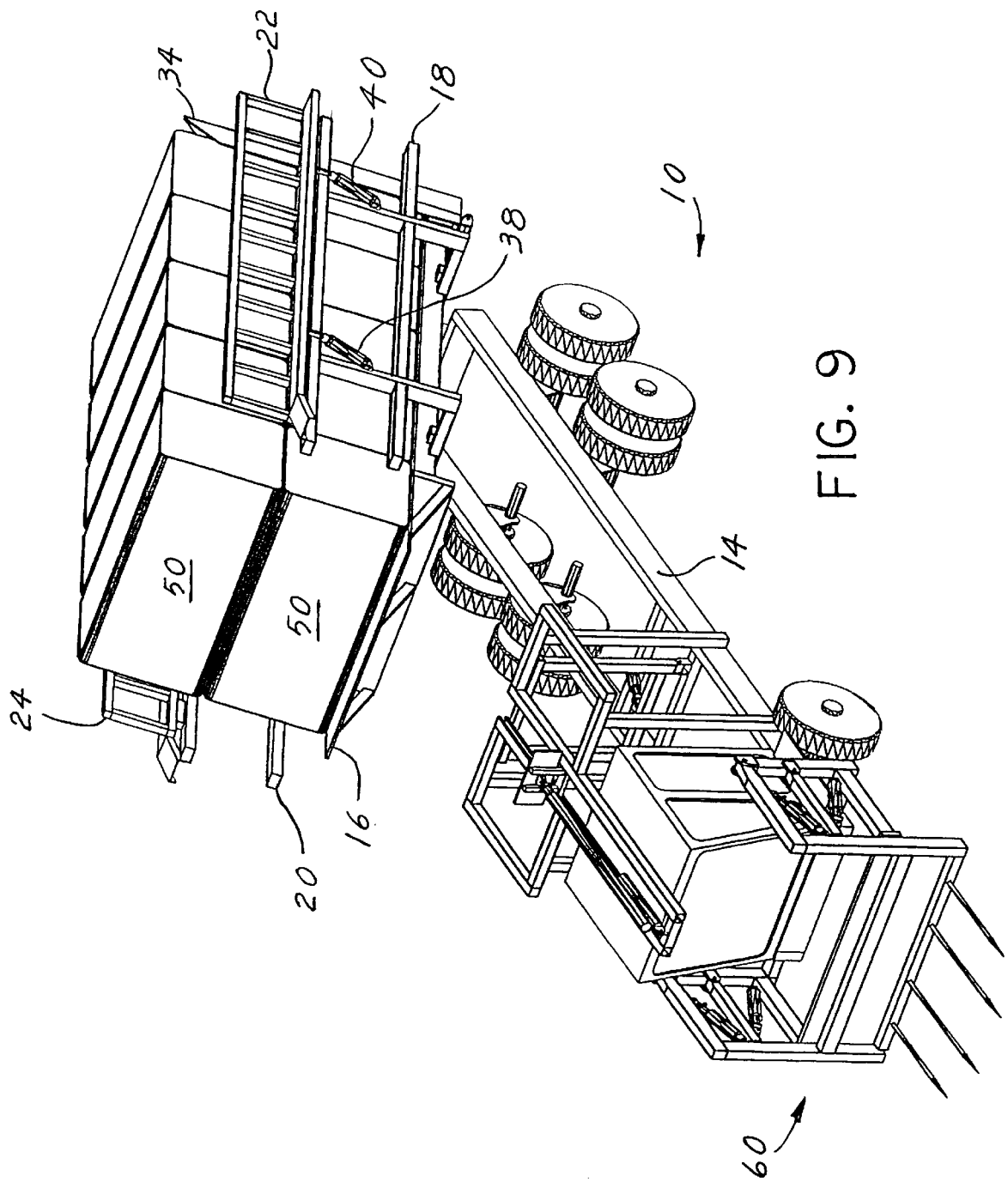
FIGS. 9–12 are perspective views showing how successive bedloads of hay bales are unloaded.

After the bottom layer of bales 50 is completed, the bed 16 returns to the horizontal position shown in FIGS. 7–8. The rails 18 and 20 are then moved to an "inward" position, so that the rails press against the sides of the bottom layer of bales. In this manner, the bales are forced into even alignment, with their sides substantially flush with one another. Also, the racks 22 and 24 swing inwardly to a horizontal position, resting flat over the upper surfaces of the bottom layer of hay, as shown in FIG. 8. At this point, the flanges 23 and 27 have also pivoted to an upright position. As with the railings 18 and 20, the flanges 23 and 27 are flared at their ends near the cab 12, so as to act as a funnel guide for the bales to be loaded (see FIGS. 1 and 8).

The top layer of hay bales 50 is then loaded over the horizontal racks 22 and 24, using the same procedure as described above, with the exception that the bed 16 remains in a horizontal position. Instead of using gravity to slide the bales 50 rearward along the racks, the pusher 84 supplies all of the necessary force. The racks 22 and 24 act as a low-friction sliding surface for the bales, with the flanges 23 and 27 guiding and positioning the bales as they slide rearward. Although the racks 22 and 24 are shown in the drawings as a series of lateral crossbars, it is to be appreciated that a cover can be placed on these racks or that the racks can have continuous surfaces, with these alternative designs aimed towards assisting the sliding of the bales.

Once the top layer of bales are loaded, the railings 18 and 20 move again to the outward position, with the racks 22 and 24 also concurrently sliding out from under the top layer of bales and swinging back to a vertical position. Afterwards, the rail and rack assembly both move back inwardly. This final inward movement allows the vertical racks 22 and 24 to press against and align the top layer of bales with the bottom layer of bales. During all of the inward and outward movement of the rails and racks, the forks 34 and 36 can also move in a corresponding fashion to add additional gripping, alignment, and stability to the dual-layer stack of bales.

Once loaded, the retriever/stacker 10 can transport the bales 50 to the storage location. FIGS. 9–12 show a typical unloading sequence, where the bed 16 is tilted to a vertical position. The rail and rack assembly, as well as the forks 34 and 36, are moved outwardly to release the bales. The retriever/stacker 10 can then simply drive out, completing the unloading process.

The specific components and operation of the loader 60 will now be described. FIG. 4 shows a side view of the loader 60, with the other side being identical. There is a vertical support arm 62, with its lower end mounted to the front end of the retriever/stacker 10. A first link 70 is pivotally connected at 74 to the support arm 62, between the lower end and the upper end 64 of the support arm 62. An L-shaped second link 66 is pivotally connected to the upper end 64 of the support arm 62. A plurality of tines 82 are located on the other end of the second link 66 for impaling a bale 50.

A first hydraulic cylinder 78 is pivotally connected at one end 80 to the forward end of the retriever/stacker or to some other suitably fixed location in the same general area. The other end of the first cylinder 78 is pivotally connected to the first link 70 (at and near the end 72). One end of second hydraulic cylinder 76 is pivotally connected to the first link 70 (also near 72). The other end of cylinder 76 is pivotally connected to the second link 66, at a location that is offset from the pivotal connection at 64.

When the tines 82 are in the impaling position, parallel to the ground, as shown in FIG. 1, the cylinders 76 and 78 are in their contracted position. After the retriever/stacker 10 impales a bale 50 (see FIG. 4), the piston rod of cylinder 78 is actuated to extend outwardly, causing the first link 70 to pivot to a substantially vertical position about 74. This action causes corresponding pivoting movement of the second link 66 about point 64, resulting in the bale 50 being lifted off the ground and rotated in a direction towards the top of the cab 12.

When the bale 50 reaches a position that is approximately above the cab 12, the piston rod of cylinder 76 extends to complete the rotation, causing further pivoting of second link 66 and positioning the bale 50 in front of the plate 86, on the edge of bed 16 (see FIG. 5). The bale 50 is then pushed onto the bed 16 by the pusher 84. The pivoting sequence of the loader 60 is reversed to return the tines 82 to ground level to impale another bale 50.

Figure 13:
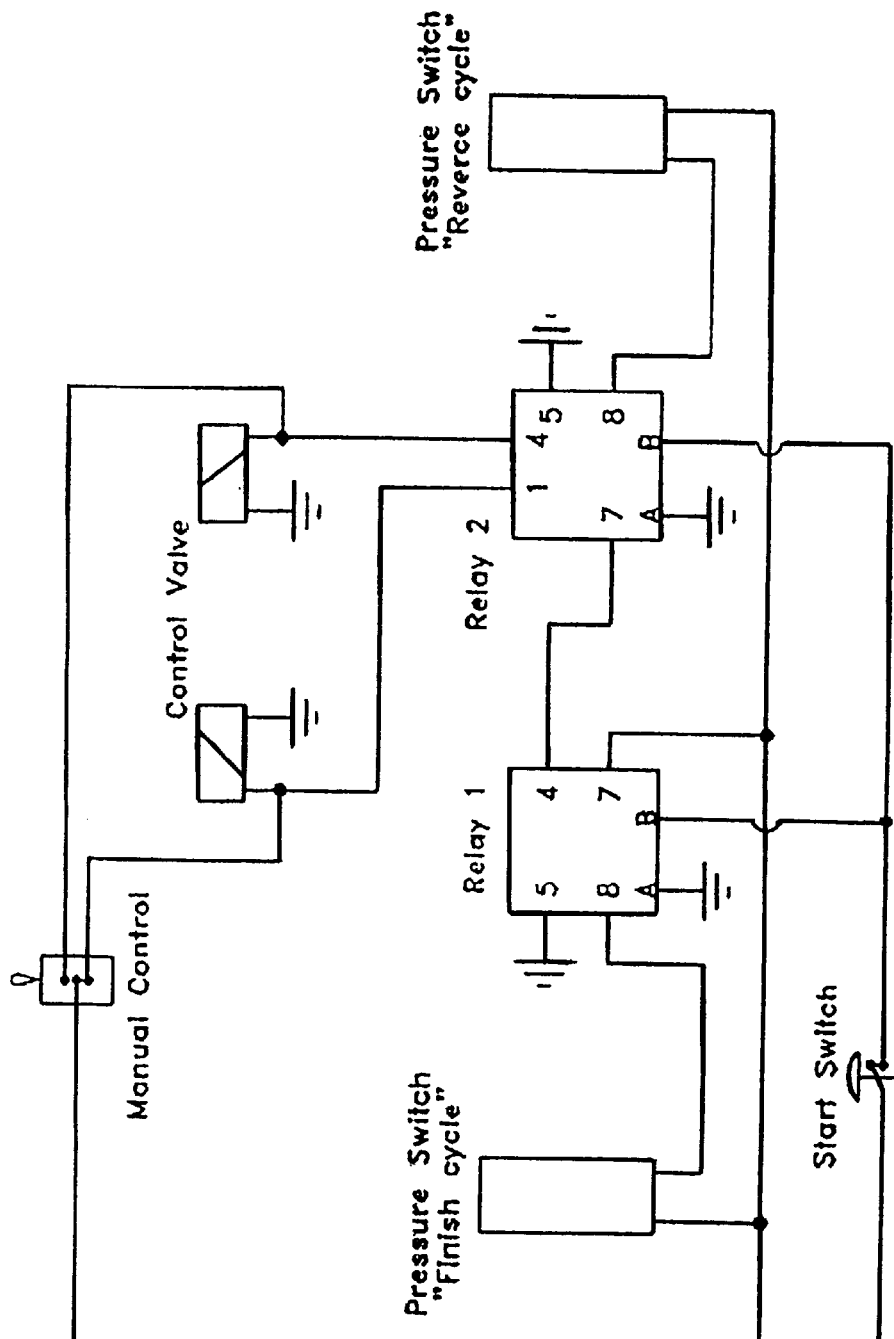
FIG. 13 is a schematic of the controls for the retriever/stacker shown in FIGS. 1–12.
Figure 14:
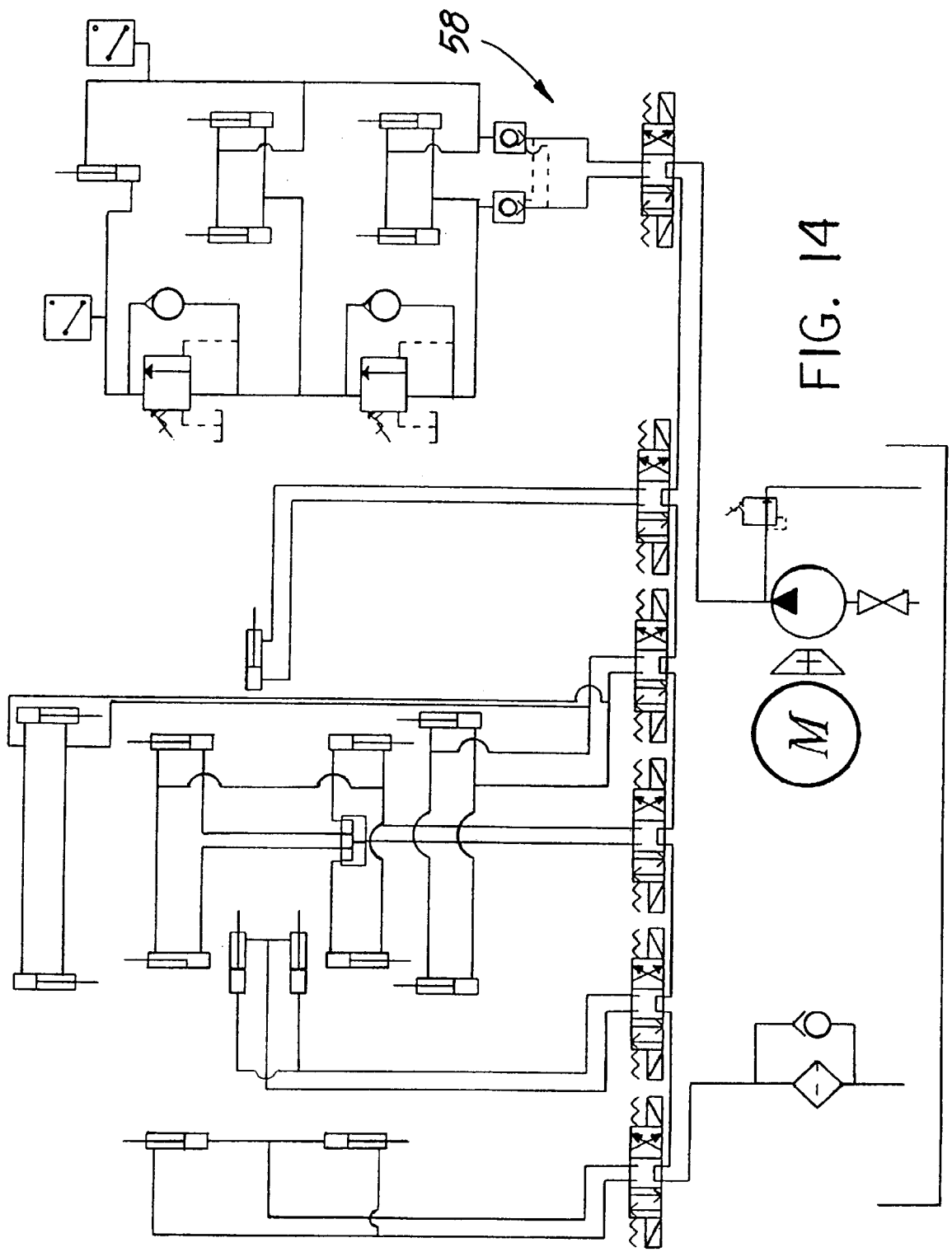
FIG. 14 is a hydraulic schematic for the retriever/stacker shown in FIGS. 1–12.

FIG. 13 shows the electronic schematic for the hydraulic controls 56 of the invention. FIG. 14 shows the hydraulic schematic 58. Because a person skilled in the art would understand how to install and implement these controls, they will not be described here further.

It is to be understood that the invention is not to be limited to the specific embodiment described above. Reasonable changes and new improvements to the invention may be made in the future without departing from the scope of the invention. For example, while the drawings show a pair of movable railings, a similar retriever/stacker can be designed that has only one movable railing, with the other railing being fixed and stationary.

Consequently, the scope of the invention is to be limited solely by the claims that follow, with the scope being determined under the established doctrines of patent claim interpretation.

What is claimed is:

1. A self-propelled hay bale retriever and stacker ("retriever/stacker"), comprising:
    a tiltable bed, for receiving and carrying a stack of hay bales;
    a pair of spaced-apart side railings mounted to the bed, each railing having an operative length that enables the railing to press along the length of a row of bales on the bed, the railings being movable laterally inwardly and outwardly, and further, each side railing carries an upper rack that is pivotable for swinging movement along a lengthwise axis relative to the side railing, and still further, the upper rack has substantially the same operative length as the side railing below.

2. A self-propelled hay bale retriever and stacker ("retriever/stacker"), comprising:
    a tiltable bed;
    a pair of spaced-apart side railings mounted to the bed, the railings being movable inwardly and outwardly, and further, each side railing carries an upper rack that is pivotable for swinging movement along a lengthwise axis relative to the side railing, and further comprising a pair of spreadable forks mounted at the aft end of the bed, the forks being movable inwardly and outwardly relative to the sides of the bed.

3. The retriever/stacker of claim 2, further comprising a loader mounted at the front end of the retriever/stacker, the loader comprising:
    a vertical support arm having an upper end and a lower end, the lower end being mounted to the front end of the retriever/stacker;
    a first link having an end pivotally connected to the support arm at a location between the upper end and the lower end of the support arm;
    a second link having an end pivotally connected to the upper end of the support arm;
    a first hydraulic cylinder having two ends, with one end of the first hydraulic cylinder pivotally connected to the front end of the retriever/stacker and the other end of the first hydraulic cylinder pivotally connected to the first link; and
    a second hydraulic cylinder having two ends, with one end of the second hydraulic cylinder pivotally connected to the first link and the other end of the second hydraulic cylinder pivotally connected to the second link, such that in operation, the first and second hydraulic cylinders are extendable to pivot the first and second links about the support arm.

4. A self-propelled hay bale retriever and stacker ("retriever/stacker"), comprising:
    a tiltable bed;
    a pair of spaced-apart side railings mounted to the bed, the railings being movable inwardly and outwardly, and further, each side railing carries an upper rack that is pivotable for swinging movement along a lengthwise axis relative to the side railing, and further comprising a pusher mounted to the front end of the retriever/stacker, wherein the pusher includes a hydraulic cylinder, and in operation, the cylinder is extendable to exert a force for pushing a bale onto the bed.

5. The retriever/stacker of claim 4, further comprising a loader mounted at the front end of the retriever/stacker, the loader comprising:
    a vertical support arm having an upper end and a lower end, the lower end being mounted to the front end of the retriever/stacker;
    a first link having an end pivotally connected to the support arm at a location between the upper end and the lower end of the support arm;
    a second link having an end pivotally connected to the upper end of the support arm;
    a first hydraulic cylinder having two ends, with one end of the first hydraulic cylinder pivotally connected to the front end of the retriever/stacker and the other end of the first hydraulic cylinder pivotally connected to the first link; and
    a second hydraulic cylinder having two ends, with one end of the second hydraulic cylinder pivotally connected to the first link and the other end of the second hydraulic cylinder pivotally connected to the second link, such that in operation, the first and second hydraulic cylinders are extendable to pivot the first and second links about the support arm.

6. A self-propelled hay bale retriever and stacker ("retriever/stacker"), comprising:
    a tiltable bed;
    a pair of spaced-apart side railings mounted to the bed, the railings being movable inwardly and outwardly, and further, each side railing carries an upper rack that is pivotable for swinging movement along a lengthwise axis relative to the side railing, and further comprising a loader mounted at the front end of the retriever/stacker, the loader comprising:
    a vertical support arm having an upper end and a lower end, the lower end being mounted to the front end of the retriever/stacker;
    a first link having an end pivotally connected to the support arm at a location between the upper end and the lower end of the support arm;

a second link having an end pivotally connected to the upper end of the support arm;

a first hydraulic cylinder having two ends, with one end of the first hydraulic cylinder pivotally connected to the front end of the retriever/stacker and the other end of the first hydraulic cylinder pivotally connected to the first link; and a second hydraulic cylinder having two ends, with one end of the second hydraulic cylinder pivotally connected to the first link and the other end of the second hydraulic cylinder pivotally connected to the second link, such that in operation, the first and second hydraulic cylinders are extendable to pivot the first and second links about the support arm.

7. The retriever/stacker of claim 6, further comprising a loader mounted at the front end of the retriever/stacker, the loader comprising:

a vertical support arm having an upper end and a lower end, the lower end being mounted to the front end of the retriever/stacker;

a first link having an end pivotally connected to the support arm at a location between the upper end and the lower end of the support arm;

a second link having an end pivotally connected to the upper end of the support arm;

a first hydraulic cylinder having two ends, with one end of the first hydraulic cylinder pivotally connected to the front end of the retriever/stacker and the other end of the first hydraulic cylinder pivotally connected to the first link; and a second hydraulic cylinder having two ends, with one end of the second hydraulic cylinder pivotally connected to the first link and the other end of the second hydraulic cylinder pivotally connected to the second link, such that in operation, the first and second hydraulic cylinders are extendable to pivot the first and second links about the support arm.

8. A device for lifting and moving a hay bale, the device being adapted to be mounted to the front end of a self-propelled hay bale retriever and stacker ("retriever/stacker"), comprising:

a vertical support arm having an upper end and a lower end, the lower end being mounted to the front end of the retriever/stacker;

a first link having an end pivotally connected to the support arm at a location between the upper end and the lower end of the support arm;

a second, L-shaped link having an end pivotally connected to the upper end of the support arm;

a first hydraulic cylinder having two ends, with one end of the first hydraulic cylinder pivotally connected adjacent to the front end of the retriever/stacker and the other end of the first hydraulic cylinder pivotally connected to the first link;

a second hydraulic cylinder having two ends, with one end of the second hydraulic cylinder pivotally connected to the first link and the other end of the second hydraulic cylinder pivotally connected to the second, L-shaped link, and wherein the position of the connection between the second hydraulic cylinder and first link is forward of the position of the connection between the second hydraulic cylinder and L-shaped link, such that in operation, the first and second hydraulic cylinders are extendable to pivot the first and second links about the support arm.

* * * * *